United States Patent
Gessler

[15] 3,666,117
[45] May 30, 1972

[54] SILO DISCHARGING DEVICE

[72] Inventor: Hans Gessler, Aalen, Wurttemberg, Germany

[73] Assignee: Schwabische Huttenwerke Gesellschaft mit beschrankter Haftung, Wasseralfingen, Wurttemberg, Germany

[22] Filed: Oct. 1, 1969

[21] Appl. No.: 862,761

[30] Foreign Application Priority Data

Oct. 2, 1968 Germany.........................G 68 00 301
Mar. 25, 1969 Germany.........................G 69 11 857
Mar. 12, 1969 Switzerland............................3717/69

[52] U.S. Cl. ......................214/17 D, 198/104, 222/228
[51] Int. Cl...........................................................B65g 65/48
[58] Field of Search...................214/17 D, 17 DA; 198/214; 222/228, 410

[56] References Cited

UNITED STATES PATENTS

| 3,493,130 | 2/1970 | Laidig | 214/17 DA |
| 710,879 | 10/1902 | Mitchell | 198/214 |
| 3,193,117 | 7/1965 | Best | 214/17 DB |
| 3,394,824 | 7/1968 | Mast | 214/17 DB |

FOREIGN PATENTS OR APPLICATIONS

| 296,522 | 5/1965 | Netherlands | 214/17 D |

Primary Examiner—Robert G. Sheridan
Attorney—Walter Becker

[57] ABSTRACT

A silo discharging device with an operable conveyor element leading to a discharge opening and with a rotary motor driven cutter located above said conveying element in which the rotary cutter with the motor driving the same forms a structural unit which is separate from the conveying element.

26 Claims, 6 Drawing Figures

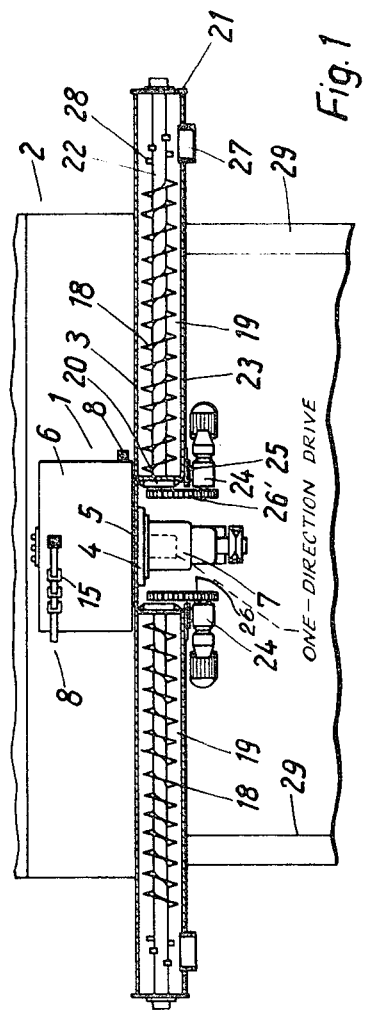
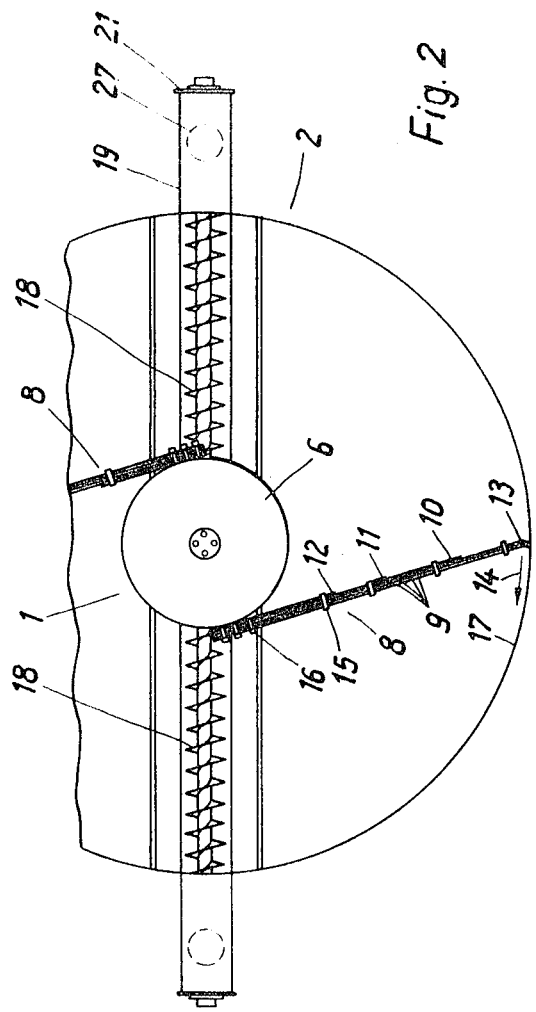

Inventor:
Hans Gessler
By Walter Becky

SILO DISCHARGING DEVICE

The present invention relates to a silo discharging device with a conveying element leading to a discharge opening and with a rotating motor-driven cutter arranged above said conveying element.

When filling silos, especially with material which does not flow easily, it may occur that such material is already, when being filled into the silo, compacted to a considerable extent so that a discharge is later hardly possible.

With heretofore known discharging devices according to which the conveying element is formed by a conveying worm, the said conveying worm is not separately operable from the rotary cutter which has protruding cutting arms, for which reason the worm must not be rotated against its working direction since otherwise the rotary cutter would likewise turn in a direction opposite to its working direction and the cutting arms would break. The backward turning of the worm may, however, be occasionally necessary, for instance, if silo material is jammed between the windings of the worm and the worm housing surrounding the same.

With heretofore known silo discharging devices in which the rotary cutter is provided with discharging arms formed by packets of leaf springs, it is disadvantageous that the resilient discharging arms break after a relatively short time of operation, such breakage occurring in the area of the free ends of the said arms even though in these areas the specific bending stresses are lower than in areas closer to the axis of rotation of the rotor.

Discharging devices with leaf spring packets have the advantage that they adapt themselves to the conditions in the silo while, depending on the load, the diameter of the path through which the discharging arms move varies in such a way that with an occurring higher load the said diameter is reduced so that the torque required for the rotation can be held within limits.

With heretofore known silo discharging devices working in conformity with the rotor principle, the withdrawal is effected by a conveyor worm which is arranged either radially or tangentially below the silo bottom and which moves in a trough formed in the bottom of the silo. Particularly with silo material which is not able to trickle out, as for instance non-dried wood chips, or chopped material, additional devices, for instance, in the form of rotating scrapers or rotating spring arms, are provided for feeding the silo material to the trough. That portion of the trough which is located within the silo area serves as reservoir or storage chamber from which the worm can withdraw material in a continuous manner even when the filling of the trough is effected, for instance, at intervals because the rotor equipped with the spring arms rotates at a relatively low speed so that the spring arms pass over the trough only at intervals.

With heretofore known silo discharging devices that portion of the withdrawing or conveying worm which is located within the vertical projection of the silo extends from the silo wall to the mantle of the rotor so that the entire effective annular cross-section of the silo is covered by the worm. Nevertheless, the withdrawal of the silo material is not effected over this entire effective cross-section but only over an opening which forms in the central silo area which corresponds to the width of the trough and, as far as its length is concerned, corresponds to the pitch of the worm. This withdrawing opening forming in the silo material is always located within the area of the innermost first effective worm windings of the conveyor worm which means directly at the rotor in the silo. If this first effective worm winding of the conveyor worm is filled, all subsequent worm windings are no longer able to receive material. Inasmuch as the rotor continuously presses the centrally located silo contents in the direction of the silo wall, i. e. the silo mantle, a mantle of compacted pourable material is formed in which no longer a movement occurs. As a result thereof, a uniform and complete discharge of the silo contents is no longer possible.

It is therefore an object of the present invention to provide a silo discharging device of the above mentioned general type which will be so designed that while being simple in construction, it will assure a safe operation and will permit a selective operation of the rotating cutter or of the conveying element.

This object and other objects and advantages of the invention will appear more clearly from the following specification in connection with the accompanying drawings, in which:

FIG. 1 illustrates partially in vertical section a discharging device according to the present invention.

FIG. 2 shows a top view of the discharging device according to FIG. 1.

Figure 4:
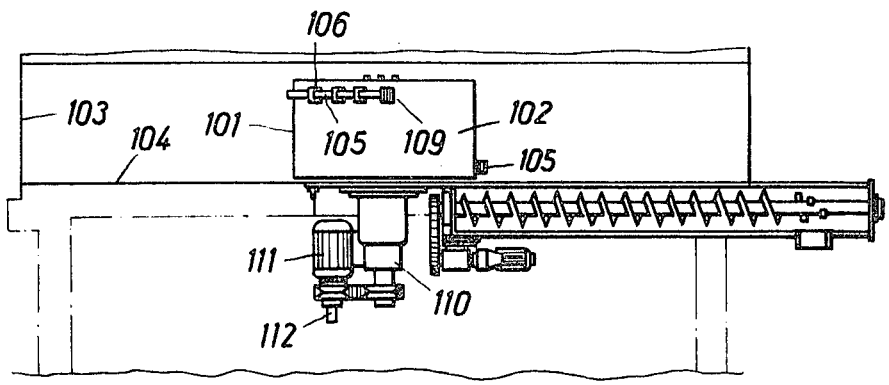
FIG. 4 shows partly in vertical section the discharging device according to FIG. 3.

With a silo discharging device having a conveying element adapted to be driven and leading to a discharging opening and also provided with a rotary cutter arranged above said conveying element, while the said cutter is drivingly connected to a motor, the rotary cutter is, in conformity with the present invention, so designed as to form a separate structural unit from the conveyor element. In this way, the rotary cutter may be rotated while the conveying element is at a standstill. Such an arrangement is of advantage particularly when the silo is filled with material which does not flow easily while by rotating the cutter such material can be prevented from compacting unduly in the silo. This can be obtained without the necessity immediately to discharge the material.

It is also an object of the present invention to provide a discharging device for silos in which the rotor is equipped with leaf spring packet arms and so to design these arms that they will not break.

This object has been realized according to the invention by connecting the rotor with a back stop. In this way the rotor will in a simple manner following its stopping, be prevented from being turned backwardly by the preloaded spring arms so that an increase in the diameter of the path of the discharging arms and thereby a pushing of the leaf spring packets into the silo material will be prevented. As a result thereof, it will be possible in a simple manner to prevent the leaf springs from breaking at the outer ends of the discharging arms. In order to be able to dimension the back stop as small as possible, advantageously the said back stop is arranged on a high speed shaft with a low torque, preferably at the output shaft of a motor drivingly connected to the rotor. The back stop may in a simple manner be formed as a free-wheel drive arranged along the axis of the pertaining shaft.

The effect obtained according to the present invention may be realized especially with a discharging device of the above mentioned general type by drivingly connecting the rotor to a brake motor. Also in this instance the rotor may after having been stopped, be prevented from turning in rearward direction by the spring arms in a simple manner so that the spreading of the spring leaf packets at the free ends and consequently a breaking of the leaf springs will be prevented. With such a structure, the brake motor may comprise a cone brake, a disc brake, or a direct current brake.

The leaf springs may be prevented from breaking at the outer ends of the discharge arms, especially with a discharging device of the above mentioned type, by interconnecting the leaf springs of the discharging arms directly adjacent to the free ends thereof, for instance, by a bandage or the like. In this instance, the discharging device may be so designed that the spring arms, after the rotor has been stopped, will due to their preload bring about a return movement or rearward turning of the rotor and thereby approximately rectilinearly push into the silo material. Since, however, the bandage located farthest outwardly displaces the leaf spring packet in the direction of the free end of the spring arm to such an extent that a spreading of the leaf springs at said end and thereby an entry of silo material between the leaf springs is avoided, it will be assured that these ends of the leaf springs will not break.

The three different solutions of the problem underlying the present invention may be provided individually or in the four possible combinations.

The present invention is based on the finding that the above mentioned spring breakage is caused not by overloading during the rotation or by occurring shocks during the discharging operation. It has been found that due to the fact that the spring arms during their rotation are bent in a direction opposite to the direction of rotation of the rotor, after the rotor has stopped, the preloaded spring arms bring about a backward turning of the rotor until the spring tension and the frictional resistance of the driving elements are in equilibrium. With this backward turning, however, the circular path through which the arms move, is increased so that their outer ends are approximately rectilinearly, similar to spears, pushed into the silo material. The silo material thus is pushed between the individual spring leaves of each spring arm so that the leaf springs at the free ends of the spring arm are spread by the silo material which enters therebetween like a wedge. Since the individual leaf springs or discs are held together by bandages, this spreading within the area of the bandage which is radially located farthest causes such high bending forces that the spread apart leaf springs will bend and fold.

It is also an object of the present invention so to design the silo discharging device that a discharge of the silo material will be possible over the entire effective length of the conveying worm which is located within the vertical projection of the silo. This object has been realized with a silo discharging device according to the invention by causing the conveying volume of the conveying worm to increase in the conveying direction thereof so that the worm trough will over its entire length located within the area of the silo be able during the rotary movement of the conveying worm continuously to withdraw material from the silo so that the silo can be emptied over its entire cross-section in a substantially uniform manner and that the above described drawbacks of heretofore known discharging devices will be avoided.

Referring now to the drawings in detail, the silo discharging device illustrated therein comprises a rotary cutter 1 which is rotatable about a vertical axis and which is so arranged directly above the bottom 3 of a silo 2 that its axis coincides with the vertical central axis of the cylindrical silo 2. The mounting of the rotary cutter 1 is, by means of a shield 4, connected to the bottom side of the silo bottom 3 while the shaft 5 of the cutter 1 extends through the silo bottom 3 and is connected to a drum-shaped rotary body 6 of the rotary cutter 1. Flanged to the bottom side of the shield 4 is an infinitely variable electrically driven control transmission motor 7 to which the shaft 5 is drivingly connected.

Two substantially parallel cutting arms 8 are connected to the periphery of the rotor body 6 in such a way that the cutter arms 8 extend approximately tangentially to the rotary body 6 and are located diametrically opposite to each other. One arm 8 is connected in the immediate vicinity of the upper end of the rotor body 6, whereas the other arm 6 is connected in the vicinity of the lower end of the rotary body 6. The horizontal central planes of the cutter arms 8 are located perpendicularly with regard to the axis of rotation of the rotor body 6. Each cutting arm 8 is formed by parallel leaf springs 9–12 arranged adjacent to each other. Five of said leaf springs extend over the entire length of the cutter arm 8 and at the free ends of the arms at 13 are curved in the direction of rotation of the rotor 1 as indicated by the arrow 14. The three shorter leaf spring elements 10–12 which with regard to the direction of rotation indicated by the arrow 14 are located on the back side have stepped shorter length so that the spring cross section of each cutter arm 8 decreases from its area of connection with the rotary body 6 to the free end 13. The leaf spring elements 9–12 are held together by spaced brackets 15 or the like. All of the leaf spring elements 9–12 are by common screws 16 detachably connected to the rotor body 6. The diameter of the path of movement of the free ends of the cutter arms 8 corresponds to the inner diameter of the cylindrical silo 2 so that the free cutter arm ends 13, will in response to the rotation of the rotary cutter 1, shave along the inner wall 17 of the silo mantle or wall.

Directly below the rotary cutter 1 there are provided two conveyor worms 18 which extend radially with regard to said cutter 1 and are located diametrically opposite to each other. These conveyor worms 18 are located in conveyor passages or channels 19 or conveyor troughs which have a U-shaped cross section and are rotatable about horizontal axes. Each conveyor passage 19 is to the bottom side of the silo bottom 3 connected in such a way that the conveying passages 19 are open toward the top and the silo material loosened by the rotary cutter 1 can drop downwardly into the conveying passages 19. The silo bottom 3 is, in the said area, recessed in conformity with the width of said passage.

Each conveying passage 19 has both end faces respectively provided with a bearing bracket or plate 20, 21 having rotatably journalled therein the shaft 22 of the pertaining conveying worm 18. Within the area of the radially inner end of the conveying passage 19 and at the bottom side 23 thereof there is detachably connected to a flange 25 an infinitely variable electrically operable control drive motor 24. The output pinion of the control drive motor 24 is, by means of a substantially vertical upwardly extending roller chain 26, connected to a pinion 26' which is keyed to the worm shaft 22 outside the conveying passage 19. The roller chain 26 is located directly adjacent to the control drive motor 7 of the rotary cutter 6. The motor 7 is thus located between the two roller chains 26 of the two oppositely located conveyor worms 18. The pinions of the motor 24 of the worm shaft 22 are easily detachable so that the transmission ratio of the one step transmission between the control drive motor 24 and worm shaft 18 can be varied in a simple manner.

Within the vicinity of the radially outer end of each conveying passage 19, which outer end protrudes beyond the silo wall, the bottom 23 of each conveying passage 19 is provided with a vertically downwardly directed discharge opening 27 formed by a tubular extension. Above the said discharge opening 27 the worm shaft 22 which in this area has no worm winding is provided with radially protruding pivot-like cutting extensions 28 which are distributed over the circumference and in longitudinal direction and which are adapted to loosen the silo material conveyed to the radially outer end of the conveying passage 19, in such a way that it will easily drop downwardly through the discharge opening 27. As will be evident from FIG. 1, the silo 2 is so arranged that its bottom 3 is located above the mounting plane. With the illustrated embodiment, the silo 2 is mounted on legs 29 so that the silo discharge device is easily accessible from below at any desired time. It is also possible to mount the silo bottom 3 on a concrete plate with a chamber therebelow.

The conveying worms 18 may have the same or different conveying output while being able to be driven independently of each other.

If the rotary cutter 1 should be subjected to an overload, the arms 8 will be bent correspondingly so that they will automatically adjust themselves to a shorter diameter of rotation whereby the resistance encountered by the cutting arms will be reduced. This represents an effective protection against overload damage.

Figure 3:
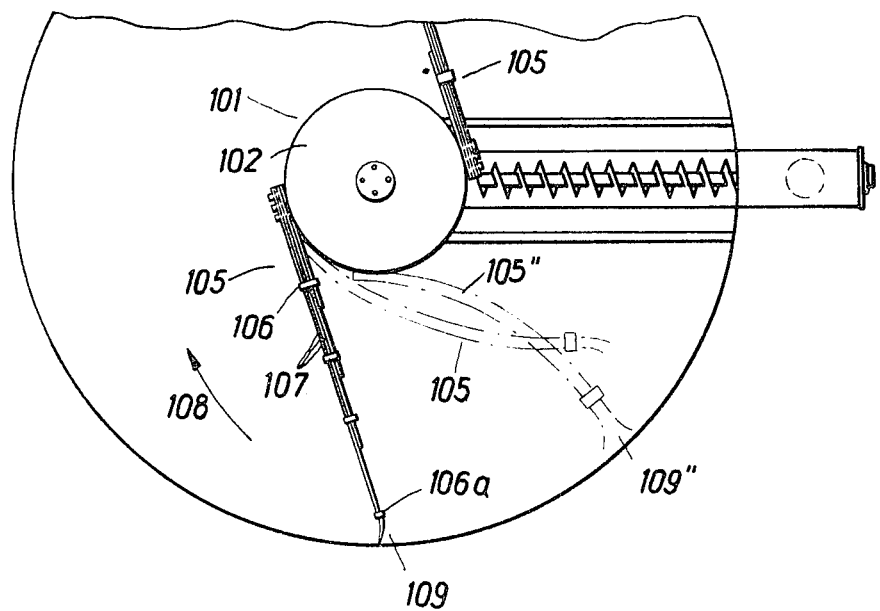
FIG. 3 represents a further embodiment of a discharging device according to the invention as seen from the top.

The discharging device illustrated in FIGS. 3 and 4 has a rotor 101 with a drum-shaped rotary body 102 located in the central axis of a silo 103 directly above the bottom wall 104 thereof. The circumference of the rotor body 102 has connected thereto two oppositely located discharging arms 105 which are located opposite to each other and when in relaxed condition extend substantially rectilinearly while protruding tangentially. The diameter of the path of movement of said arms 105 approximately equals the inner diameter of the silo 103. Each discharging arm 105 is formed by leaf springs 107 which are arranged adjacent to each other and are connected by means of bandages 106. Of these leaf springs 107, those leaf springs which in the direction of rotation of the rotor (arrow 108) are located in the front are longest, whereas those leaf springs which are located therebehind stepwise decrease in length. All leaf springs extend to the end of the respective discharge arm 105 which end is located at the rotary body 102, so that the spring cross section of the discharging arm 105 decreases to the free end 109 thereof. However, this free end 109 is formed by a plurality of adjacent leaf springs 107.

Below the bottom wall 104 of the silo 103, the rotor 101 is, through a transmission 110, drivingly connected to an electric motor 111 which together with the transmission 110 forms an infinitely variable control drive motor.

When the rotor 101 is driven by the control drive motor 110, 111, the rotor 101 rotates in the direction of the arrow 108 while the spring arms 105 are bent back by the silo or pourable material in the silo 103 in a direction counter to the direction of the arrow 108 as indicated by dot-dash lines in FIG. 3 at 105'. The spring arms 105 thus will during the operation of the discharging device 101 be under a preload. If the rotor 101 is now stopped, it will be turned back in counter direction to the arrow 108 by the still prevailing preload of the spring arms 105' while overcoming the frictional resistance of the driving elements. The spring arms 105', as indicated in dot-dash lines at 105'' will stretch so that their free ends 109 like a spear enter or penetrate the silo material. In this way the silo material will pass between the individual leaf springs 109 at the free end of the spring arm 105 so that the free ends of these leaf springs, as indicated at 119'' will be spread apart and break.

According to the invention, the bandage 106a which is closest to the free end 109 of the spring arm 105 is located so far to the said free end 109 that the described spreading of the leaf springs at the free spring arm end 109 is prevented to such an extent that breakage at the leaf springs 107 will be prevented. Additionally, or independently thereof, the driving motor 111 may be designed as a brake motor with cone-discs and direct current brake. Furthermore, additionally, or independently thereof, the drive for the rotor 101 may comprise a back stop in the form of a freewheel drive, which expediently is arranged on the high speed drive shaft 112 of the drive motor 111, which drive shaft 112 rotates with a relatively low torque.

Figure 5:
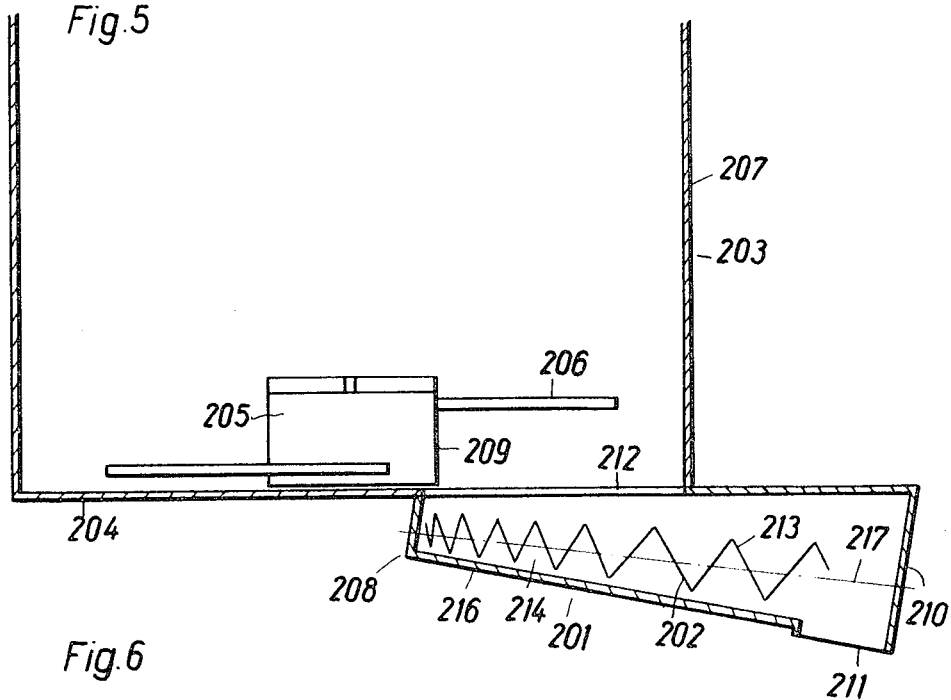
FIGS. 5 and 6 represent a further embodiment of the device according to the invention partially in section and in top view respectively.
Figure 6:
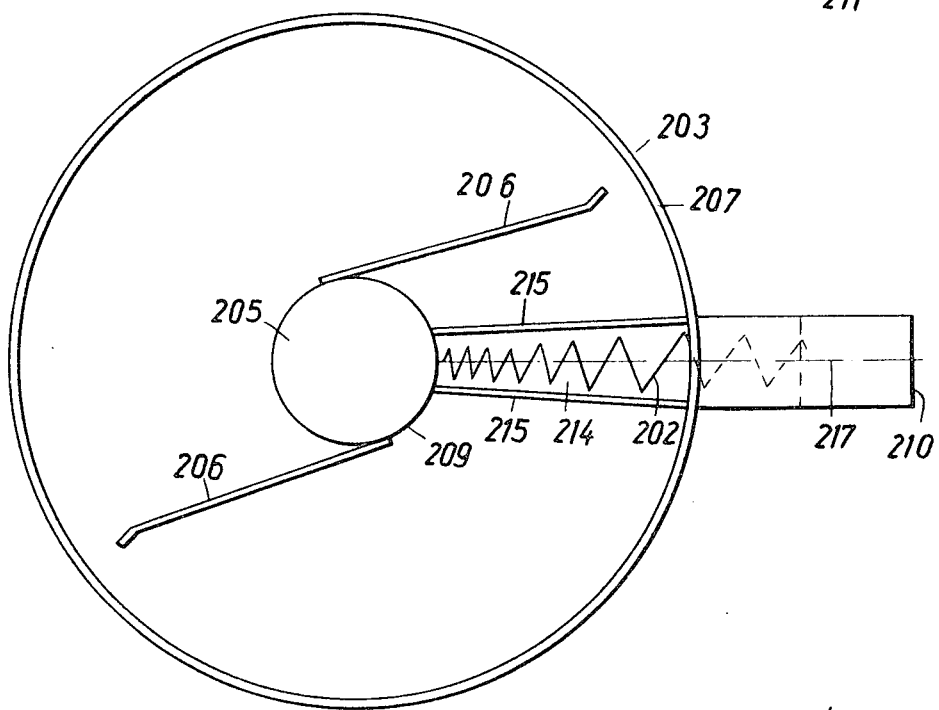

The silo discharging device illustrated in FIGS. 5 and 6 comprises a worm trough 201 in which is rotatably journalled a conveyor worm 202 which latter is sunk into the bottom wall 204 of a silo 203.

The cylindrical silo 203 has in its central shaft rotatably journalled a rotor 205 directly above the bottom wall 204 which rotor is adapted to be driven by any standard drive (not shown). The substantially cylindrical rotor body 205 has connected thereto tangential spring arms 206 which extend approximately to the silo mantle or wall 207.

The vertical central plane of the worm trough 201 is located in a radial plane which extends through the central axis of the silo 203 in such a way that the central axis of the conveyor worm 202 which axis is located in the vertical central plane of the trough 201 is likewise located in said radial plane. The radial inner end 208 of the worm trough 201 ends slightly short of the rotor mantle 209, whereas the outer end 210 of the worm trough 201 is located outside the trough mantle 207 and has its bottom side provided with a discharge opening 211 for the silo material, said discharge opening 211 being formed by a tubular section.

The worm trough 201 which, at least in the area of the vertical projection of the silo 203, is open at the top is located within the area of an opening 212 which corresponds to the width of said trough 201 and is provided in the bottom wall 204 of the silo 203 so that the silo material will be able to pass through this opening 212 into the worm trough 201.

The inner surfaces of the worm trough 201 together with the circumferential surface 213 of the conveying worm 202 in the worm trough 201 define a free cross section 214 for receiving the silo material. As will be evident from FIGS. 5 and 6, this cross section 214 increases from the inner end 208 of the worm trough 201 to the outer end 210 of the latter. The increase in the cross section 214 extends up to the silo mantle 207. This increase in the conveying volume of the worm trough 201 and of the worm 202 has been realized by three features which with the illustrated embodiment are combined with each other but may be employed individually. One of these features consists in that the free inner cross section of the worm trough 201 increases from the inner end 208 to the outer end 210. This has been realized on one hand by the fact that the vertically provided lateral parts 215 of the annular worm trough 201 flare from the inner end 208 of trough 201 to the silo mantle 207 while forming with each other an acute angle. On the other hand, the curved lower portion 216 of the trough 201 extends from the inner end 208 of said trough 201 to the discharge opening 211 at an acute angle with regard to the silo bottom 204 at a downward incline. Inasmuch as the lateral parts 215 of the worm trough 201 extend outside the silo mantle 207 parallel to each other, and since in this area, the free inner cross section of the trough increases only by the inclined arrangement of the curved lower part 216, the increase in the free trough cross section outside the silo mantle 207 is less than within the area of the vertical projection of the silo 203.

The second feature consists in that the conveyor worm 201 conically increases from the inner end 208 of the trough 201 in the direction toward the outer end 210 as far as the outer diameter is concerned in such a way that the inner surface of the trough has mantle lines which are parallel to the oppositely located mantle lines of the conveyor worm 202. As shown in FIG. 6, the conical widening of the conveyor worm 202 extends only up to the silo mantle 207 whereas that portion of the conveyor worm 202 which is located outside the silo mantle 207 is analogous to the here parallelly extending lateral parts 215 of trough 201 of a cylindrical shape.

The third feature consists in that the pitch of the conveyor worm 202 progressively increases from its inner end which is located adjacent the end 208 of trough 201, in the direction to the outer end 210 of said trough. This increase might be provided only up to the silo mantle 207. The axis of rotation 217 of the conveyor worm 202 is in the direction toward the outer end 210 of trough 201 inclined in downward direction at an acute angle with regard to the silo bottom. The angle between the silo bottom 204 and the axis of rotation 217 is greater than the cone angle of the conveyor worm 202 so that the uppermost mantle line of the conveyor worm 202 likewise forms an acute angle with regard to the silo bottom 204. The volume of the trough above the axis of the worm acts as reservoir. In this connection it is advantageous to progressively design this volume in conformity with the progressive worm volume. This results in a worm axis according to FIG. 1 which forms an acute angle with the silo bottom. That portion of the trough which is located below the axis of the worm is spaced everywhere by the same distance from the oppositely located mantle line of the conveyor worm. This arrangement functionally represents the ideal case. Since, however, a conically designed trough with inclined worm axis is more expensive to produce than a trough with surfaces which are parallel on all sides and with a worm axis which is parallel to the silo bottom, depending on the silo material, also a worm may be provided with an outer diameter which in the feeding direction increases conically and/or has a progressive pitch while the axis of said worm is parallel to the silo bottom and said worm is built into a cylindrically designed trough. During the operation, that portion of the trough cross section which is located below the worm axis and which is not overlapped by the effective worm cross section will be covered with silo material in such a way that automatically a conical trough cross section is formed in conformity with the worm. Merely that trough portion which serves as reservoir and is located above the worm axis will in this instance not receive the desired volume increasing from the inside toward the outside which would be in conformity with the worm having a progressive receiving volume. This, however, can be compensated for by making the height of the trough portion above the worm axis so great that it will also be sufficient for the worm winding with large receiving volume. With the windings with smaller volume, the trough volume located thereabove will not be fully taken advantage of, which, however, does not bring about any drawbacks. This design may, inasmuch as it approaches the ideal instance, be employed frequently, particularly inasmuch as it is more favorable with regard to the manufacture. The trough preferably represents a groove, the cross section of which is semicircular above the axis of the worm, said semicircle being widened above the worm axis by straight, preferably parallel parts, extending to the silo bottom.

The silo discharging device according to the invention has among others, the advantage that it can also be applied in a simple manner to a silo already in existence. Furthermore, an independent adaptation of the speed of movement of the conveying element and the rotary cutter to the silo material to be discharged will be possible.

It is, of course, to be understood that the present invention is, by no means, limited to the particular showing in the drawings, but also comprises any modifications within the scope of the appended claims.

What I claim is:

1. In combination with a silo discharging arrangement having a bottom, which includes: drum form rotary means having peripherally distributed cutting arm means arranged above said bottom for loosening material in said silo to facilitate the discharge of said material radially from said silo, motor means drivingly connected to said rotary means and forming a structural unit therewith, conveying means communicating with the interior of said silo for discharging material radially from said silo, and variable driving means independently controlled separately from said motor means and operatively connected to said conveying means, said structural unit being operable independently of said driving means and said conveying means operatively connected to the latter, at least one of said cutting arm means being arranged directly in proximity to the silo bottom and said motor means for driving thereof lying below the silo bottom, directly on said rotary means and above lower cutting arm means there being at least a further cutting arm means, means defining a space above said drum form rotary means being maintained free of cutting arms, said conveying means including two conveyor worm means located across from each other whereby said rotary means with cutting arm means and said conveyor worm means are separately driven by said motor means and said driving means respectively, each of said conveyor worm means increasing in diameter outwardly from its inner end to its outer end at the outer periphery of the silo.

2. An arrangement according to claim 1, in which said bottom is provided with opening means, and in which said conveying means includes conveying channel means arranged below said opening means and provided with a discharge opening.

3. An arrangement according to claim 1, in which said conveying means includes a longitudinal conveying member extending from a central area of said bottom but below the same in the direction toward the outer wall of said silo, and in which said separate driving means is arranged in free space within the area of the radially inner end of said conveying member and is operatively connected to the latter.

4. An arrangement according to claim 1, in which said conveying means independently constructed includes said conveyor worm means located in said channel means and drivingly connected to said driving means, said separate driving means being arranged below said bottom.

5. An arrangement according to claim 2, in which said channel means extend beyond the outer wall of said silo and have a discharge opening for discharging the material from within said channel means.

6. An arrangement according to claim 5, which includes a plurality of conveying means distributed about the axis of said rotary means.

7. An arrangement according to claim 6, in which said motor means for driving said rotary means is connected to the underside of said silo bottom.

8. An arrangement according to claim 7, in which said rotary means comprises a rotatable substantially drum-shaped body, and elastically flexible distributing arm means connected to said drum-shaped body while in unloaded condition extending substantially tangentially to said drum-shaped body.

9. In combination with a silo discharging arrangement having a bottom, which includes: rotary means having peripherally distributed cutting arm means arranged above said bottom for loosening material in said silo to facilitate the discharge of said material radially from said silo, motor means drivingly connected to said rotary means and forming a structural unit therewith, conveying means communicating with the interior of said silo for discharging material radially from said silo, driving means independently controlled separately from said motor means and operatively connected to said conveying means, said structural unit being operable independently of said driving means and said conveying means operatively connected to the latter, at least one of said cutting arm means being arranged directly in proximity to the silo bottom and said motor means for driving thereof lying below the silo bottom, and a further cutting arm means on said rotary means above said one of said cutting arm means, a space above said rotary means being maintained free of cutting arms, said conveying means including two conveyor worm means located across from each other whereby said rotary means with cutting arm means and said conveyor worm means are separately driven by said motor means and said driving means respectively, said bottom being provided with opening means, said conveying means including conveying channel means arranged below said opening means and provided with a discharge opening, said channel means extending beyond the outer wall of said silo and having a discharge opening for discharging the material from within said channel means, said motor means for driving said rotary means being connected to the underside of said silo bottom, said rotary means comprising a rotatable substantially drum-shaped body, and said cutting arm means being elastically flexible distributing arm means connected to said drum-shaped body and in unloaded condition extending substantially tangentially to said drum-shaped body, and means for permitting rotation of said rotary means in one direction only.

10. An arrangement according to claim 9, in which said means includes a back stop associated with said motor means which is drivingly connected to said rotary means.

11. An arrangement according to claim 9, in which said motor means includes brake motor means.

12. An arrangement according to claim 9, in which said elastically flexible distributing arm means are formed by a plurality of leaf springs superimposed upon each other and stepwise decreasing in cross section in the direction from the rotary means toward the outer wall of said silo.

13. An arrangement according to claim 12, in which the steps of the flexible distributing arm means are formed by different lengths of leaf springs and are located on that side of said arm means which face in a direction opposite to the direction of rotation of said rotary means.

14. An arrangement according to claim 9, which includes a plurality of distributing arm means connected to and arranged at different levels of said rotary means and extend from said rotary means in the direction toward the outer wall of said silo.

15. An arrangement according to claim 9, in which said elastically flexible distributing arm means are formed by superimposed leaf springs, and which includes bracket means holding said leaf springs together, at least one of said leaf springs being arranged in the vicinity of the outer end of said arm means while holding the respective spring leaves together at a force exceeding the maximum spreading force exerted upon said outer ends of said arm means when advancing said arm means into the material in the silo.

16. An arrangement according to claim 15, in which the outer tip of said arm means is bent in the operative direction of rotation of said rotary means carrying said arm means.

17. An arrangement according to claim 9, in which the conveying volume of each worm means increases in the feeding direction thereof.

18. An arrangement according to claim 9, in which said conveying means include axially unshiftable feeding worm means rotatably arranged in said channel means, and in which the cross section of said channel means increases in the direction of feeding of said worm means, the outer diameter of said worm means being correspondingly increased at least as far as the channel section is concerned which is located within the vertical projection of said silo.

19. An arrangement according to claim 18, in which the worm means are conical, and in which the mantle lines of said channel means are substantially parallel to the oppositely located mantle lines of said worm means.

20. An arrangement according to claim 19, in which the pitch of said worm means increases progressively from its input end toward its discharge end.

21. An arrangement according to claim 20, in which the axes of said worm means form an acute angle with said bottom.

22. An arrangement according to claim 21, in which said acute angle exceeds the cone angle of the feeding worms.

23. An arrangement according to claim 18, in which said worm means and channel means therefor protrude outwardly beyond the silo walls, and in which said protruding portions of said worm means and channel means have a constant feeding volume.

24. An arrangement according to claim 18, in which the central axes of said worm means are located in a radial plane of the silo.

25. An arrangement according to claim 18, in which the central axes of said worm means are located in a tangential plane of the silo.

26. An arrangement according to claim 18, in which said channel means have substantially parallel mantle lines over the entire length thereof, the worm means in said channel means being of at least approximately conical contour.

* * * * *